US006397487B1

(12) United States Patent
Welch et al.

(10) Patent No.: US 6,397,487 B1
(45) Date of Patent: Jun. 4, 2002

(54) CONSTRUCTION TAPE

(76) Inventors: Patrick G. Welch, 9803 Irvine Ave. NW.; Peter Thorne, 3874 Minnkota Ave. NW., both of Beltrami, MN (US) 56601

( * ) Notice: Subject to any disclaimer, the term of this patent is extended or adjusted under 35 U.S.C. 154(b) by 0 days.

(21) Appl. No.: 09/523,721

(22) Filed: Mar. 11, 2000

(51) Int. Cl.⁷ .................................. G01B 3/10
(52) U.S. Cl. ........................................ 33/759; 33/562
(58) Field of Search .................. 33/759, 758, 760, 33/493, 494, 492, 771, 562, 566, 679.1

(56) References Cited

U.S. PATENT DOCUMENTS

| | | | |
|---|---|---|---|
| 2,187,087 A | | 1/1940 | Leary ........................... 33/758 |
| 3,042,990 A | * | 7/1962 | Zelnick ........................ 28/143 |
| 4,149,320 A | | 4/1979 | Troyer et al. .................. 33/758 |
| 4,367,590 A | | 1/1983 | Winter et al. .................. 33/758 |
| 4,696,110 A | | 9/1987 | Walker et al. ................. 33/759 |
| 4,845,858 A | | 7/1989 | Thomas ....................... 33/759 |
| 4,942,670 A | | 7/1990 | Brandt ......................... 33/494 |
| 5,012,590 A | | 5/1991 | Wagner et al. ................. 33/759 |
| 5,141,031 A | * | 8/1992 | Baurmeister ............ 139/383 R |
| 5,627,763 A | | 5/1997 | Carlson .......................... 703/1 |
| 5,913,586 A | * | 6/1999 | Marshall ....................... 33/759 |

\* cited by examiner

*Primary Examiner*—Diego Gutierrez
*Assistant Examiner*—R. Alexander Smith
(74) *Attorney, Agent, or Firm*—Albert W. Watkins

(57) ABSTRACT

A tape is woven on-grain and has printed thereon at repetitive intervals an optically converging marking pattern which converges onto a locating pattern. The converging patterns are most preferably lines which resemble the mathematical symbols for "greater-than" and "less-than". The converging patterns each converge on opposite sides of a rectangular box which designates where a board or other structural component will most preferably be located. Within the rectangular box is an additional line which subdivides the box equally into two parts and which contains at its center a small diamond The diamond identifies the geometric center of the structural component, for nailing or other purposes. The subdividing line may also be used in combination with the two converging patterns to locate two structural components, side-by-side. In this latter case, the two converging patterns each converge in with the rectangular box at the respective geometric centers of the two structural components.

9 Claims, 1 Drawing Sheet

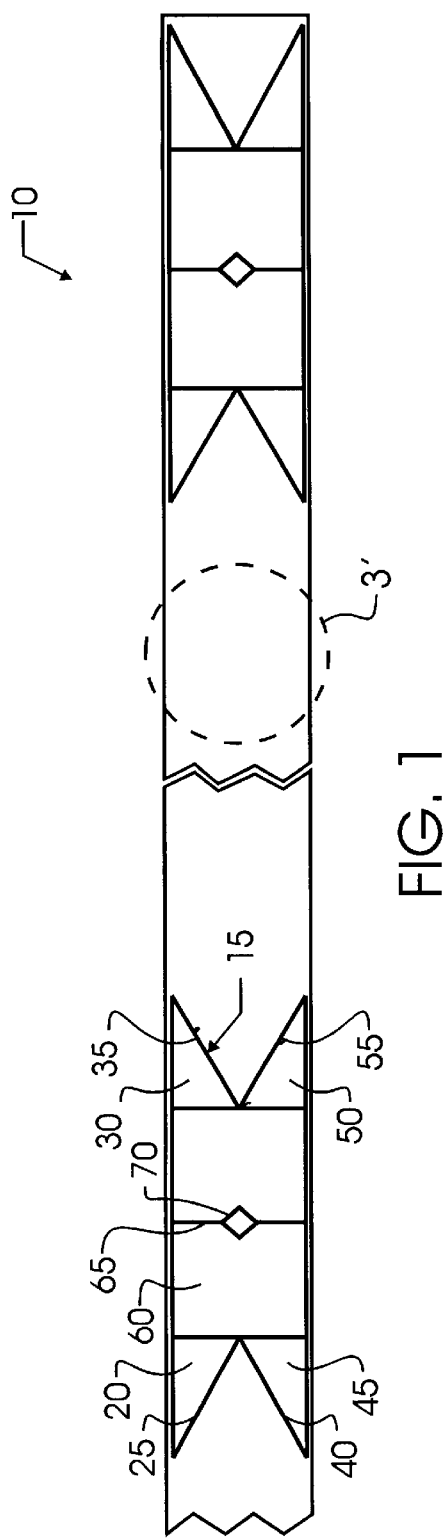
FIG. 1
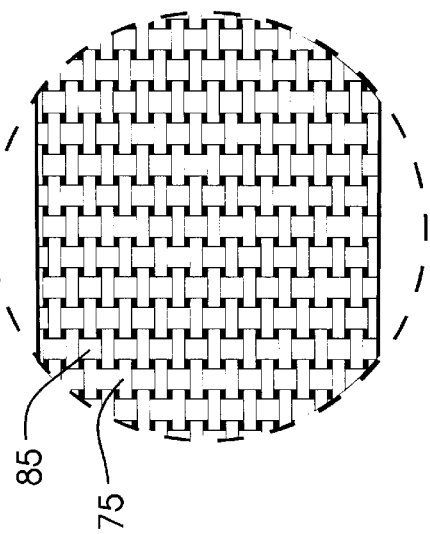
FIG. 3
FIG. 2

CONSTRUCTION TAPE

BACKGROUND OF THE INVENTION

1. Field of the Invention

This invention pertains generally to geometric instruments, and more specifically to construction tapes used in the construction of buildings and other static structures.

2. Description of the Related Art

In the construction of buildings and other static structures, it is customary to assemble the structures from various component pieces. The sheer size of most finished structures prohibits transporting them assembled. The component pieces are arranged and organized according to to the requirements of local building codes and according to the nature of the use of the structure. Quite frequently, pre-sized lumber is used as a primary component of the structural framework. This lumber is shipped compactly, and may be quickly nailed together to form the building framework.

When lumber is used in the construction of a static structure, various outer components are it framed in place, and then additional rafters,joists, studs, trusses or beams are nailed in predetermined intervals, in accord with the building construction codes. Many of these modem buildings are assembled with repeating boards, such as 2 by 4 lumber nailed in place on 16 inch, 19.2 inch, or 24 inch centers. When the pattern of repeating lumber is referred to as being on center, this means that the distance from one board to the next measured from the center of each board is the dimension recited. From a practical standpoint, so long as the lumber is all of the same dimension, the 16 inch, 19.2 inch, or 24 inch measurements may be taken between left edges, right edges, or the centers of the lumber. Various measuring devices, such as tape measures, rulers, and squares have been used to measure, layout, and mark the locations of building components. The process of marking locations involves reading graduated and numerically marked scales, including fractional distances on these devices.

When the building is designed, an architect will draw up blueprints that show the placement of the various lumber. A carpenter will read the blueprints to determine the correct placement of the lumber at the time of construction. Once the carpenter has read the blueprints, he will then use a measuring tape to mark out the locations of each of the boards. This process of marking locations requires several people working together to place the marks, or is much slower and more tedious when done individually. With several people, one person will be at each end of a stretched measuring tape. A third person will move across the length of the measuring tape, scribing marks into the framework to identify the location of each board. This method, while requiring three people, tends to be relatively fast. Unfortunately, general-purpose measuring tapes have many distance marks to choose from when deciding where the next board will need to be placed. AU too frequently, the person scribing marks will perform a mathematical miscalculation, and, for example, shift a mark and all subsequent marks a few inches from where the marks belong. If the mistake is not detected prior to nailing the lumber into place, substantial costs are unnecessarily incurred. Moreover, the skill required to place lumber and drive nails is very different from the mathematical skills necessary to calculate the various fractional distances. This method requires a carpenter who is not only skilled in the building trade, but also mathematically in the calculation of fractions.

When a single person marks the locations, this may be done by incrementally working across the span, for example, in 16 inch increments. While not requiring as many people or the calculation of fractions, the incremental method tends to be less precise. The measuring tape or square may deviate from parallel along the framework. Additionally, each measurement introduces its own error of resolution, which is cumulative over a span and may lead to significant distance deviations over a long distance. Furthermore, the continual repositioning of one's person and measuring and scribing tools can be quite time-consuming and costly when equating working time with wages paid by the employer.

Recognizing the need for better measurement tools, a number of tapes are illustrated in the prior art. For example, Wagner et al. in U.S. Pat. No. 5,012,590 illustrated a symbolic tape which uses an outline of a human foot to designate intervals measured in feet, diamonds, circles and shading of the same. While this tape is designed to simplify the measurement process by removing the multitudes of fractions found on a more general-purpose measuring tape, the carpenter must still calculate the various fractional sums and measurements. For example, using 16 inch centers, the second board will be one and one-third feet from the first. The next board will be two and two-thirds feet from the first,and so forth. A miscalculation will, as described above, result in an undesired shift of the marks. Similar tapes that use various symbols are disclosed by Troyer et al. in U.S. Pat. No. 4,149,320; Winter at al. in U.S. Pat. No. 4,367,590; and Walker et al. in U.S. Pat. No. 4,696,110.

Carlson, in U.S. Pat. No. 5,627,763, illustrates computer-generated tapes that identify in writing the locations of various building components. This tape is custom to a particular construction project, and may be used to assist in the construction, by removing the need for tedious measuring and scribing. However, the use of these tapes requires a special printer, and special computers that are dedicated to the conversion of an architectural blueprint into the construction tape. Furthermore, should this tape become damaged or destroyed at a job site or in transit, a new tape must be procured prior to preceding with construction. This can lead to significant and costly construction delays.

Thomas, in U.S. Pat. No. 4,845,858, and Brandt, in U.S. Pat. No. 4,942,670, each illustrate colored indicia printed upon an adhesively backed tape to indicate spacing of repetitive members. These markings are visually helpful to locate a board. However, the tape must, in advance, be marked to accommodate boards of double thickness, and locating the centers can be quite challenging. Furthermore, the markings are concealed by the board once the board is correctly placed. This, unfortunately, does not provide a good indication of exactly where nailing should take place. In addition, when these tapes are used to span open areas, the adhesive is exposed and prone to entangling with other objects. Finally, these tapes are readily damaged during use or even placement. For example, if, during the placement of the tape, the tape inadvertently wrinkles or is misdirected, the tape may be destroyed by being lifted and repositioned. What is needed then, is improved apparatus for indicating repetitive spacing, which is not prone to the disadvantages of the prior art.

SUMMARY OF THE INVENTION

In a first manifestation, a construction tape is designed to locate or measure repetitive lumber spacings through an indeterminate length having a width and thickness. The improvement comprises a marker repetitively printed upon the tape. The marker has a center region defining a desired lumber location, and a first visually converging region immediately adjacent the center region which converges as the distance from said center region decreases.

In a second manifestation, the invention is a tool for locating first and second consistently sized structural components from each other within a static structure. The tool has an indeterminate length strap having a first major surface. A means is patterned upon the first major surface for establishing a desired location of a first edge of the first consistently sized structural component. A means is also patterned upon the first major surface for establishing a desired location of a second edge of the first consistently sized structural component. A means is additionally patterned upon the first major surface and adjacent the first edge visual locating means for visually interpolating a displacement from the first edge, and a means is patterned upon the first major surface and adjacent the second edge visual locating means for visually interpolating a displacement from the second edge. A means is also provided for locating the second consistently sized structural component relative to one of the first edge locating means, second edge locating means, first edge displacement interpolating means and second edge displacement interpolating means.

In a third manifestation, the invention is a method for accurately positioning lumber within a framework. The steps include forming an on-grain woven tape; printing a marker pattern onto the tape having a locating pattern and an optically converging pattern; anchoring the printed tape within the framework; positioning the lumber adjacent the marker pattern and concealing a portion including a portion of the optically converging pattern; sliding the lumber along the tape while simultaneously viewing the optically converging pattern, until the optically converging pattern converges and intersects with the locating pattern; and anchoring the lumber to the framework subsequent to sliding.

OBJECTS OF THE INVENTION

A first object of the present invention is to provide a simple-to-use measuring instrument which indicates repetitive locations. A second object of the present invention is to simplify the precise locating of a board just prior to installation. Another object of the present invention is to avoid the necessity for calculating fractional distances. A further object of the present invention is to provide a rugged tape which is not easily destroyed at a construction site. Yet another object of the present invention is to provide a tape which is also useful for those individuals who may be color blind. These and other objects are achieved in the present invention, which will be best understood from a description of the preferred embodiment.

BRIEF DESCRIPTION OF THE DRAWINGS

FIG. 1 illustrates a preferred embodiment construction tape in accord with the teachings of the present invention from a front view.

FIG. 2 illustrates the preferred embodiment tape of FIG. 1 from a side view.

FIG. 3 illustrates the preferred embodiment tape of FIG. 1 from an enlarged sectional view taken along line 3' of FIG. 1.

DESCRIPTION OF THE PREFERRED EMBODIMENT

Preferred embodiment tape 10 is illustrated in FIG. 1 from a top view, and in FIG. 2 from an edge view. Tape 10 is used at construction sites to identify desired or preexisting locations of repetitive building components. Tape 10 will most preferably be installed by tacking or stapling the tape against, for example, a header board. Repetitive marking patterns 15 are printed onto tape 10 at predetermined intervals, based upon common or custom lumber spacings. For example, in the most preferred embodiment, marking patterns 15 are spaced at 16 inch intervals. Patterns 15 include a combination of lines. These lines are provided to assist a carpenter during the installation of various construction lumber. Lines 25 and 40 together resemble the mathematical "greater-than" sign, while lines 35 and 55 together resemble a "less-than" sign. Lines 25 and 40 converge at the left edge of the vertical mid-point of rectangular box 60, while lines 35 and 55 converge at the right edge of box 60. Dividing box 60 into two equal parts is vertical line 65, and at the center of line 65 is diamond 70. While the dimensions of these lines that make up marking patterns 15 will vary, depending upon the particular lumber for an intended application, in the most preferred embodiment box 60 will be one and one-half inches in length along the longitudinal axis of tape 10. This size is selected to correspond to the thickness of a 2×4 board, which in finished thickness is one and one-half inches. Most preferably, the total width of each marking pattern 15 will be three inches, which corresponds to two 2×4 boards side-by-side. When a single board is being positioned along tape 10 the board will be slid across the surface of tape 10. While the board is being moved across the surface of tape 10, varying amounts of regions 20, 45, 30 and 50 will be visible. Regardless of the direction of view available to the carpenter, the carpenter will quickly be able to judge the position of the board. This is because, as the board is moving, lines 35, 55, 25 and 40 serve as visual indicators of the target location for the position of the board. With almost no practice, a carpenter win be able to slide a board into accurate alignment in a single rapid motion, slowing down only as the board approaches exact position. The visual cues provided by the "greater-than" and "less-than" signs formed by lines 25, 40, 35 and 55 greatly simplify the exact positioning of lumber.

Several additional lines are provided in marking patterns 15. Diamond 70 identifies the center of the board, and may be used as a nailing guide. Center line 65 is used to mark one edge of either board when two boards are used directly adjacent each other. In this case of two boards side-by-side, the intersection between lines 35, 55 and the vertical segment of box 60 identify the center point, for nailing purposes, of the right hand board. The intersection between lines 25, 40 and box 60 identify the center point, for nailing purposes, of the left hand board. Diamond 70, through the two converging side points, also marks the same vertical mid-points as converging lines 35, 25, 40 and 55. This further helps to identify the critical vertical on-center position.

As will be apparent by now, tape 10 may be manufactured to any length desired. Marking patterns 15 are most preferably imprinted at a fixed predetermined interval, though the interval may differ between different discrete tapes. In the most preferred embodiment, marking patterns 15 may be imprinted on only one side of tape 10. In an alternative embodiment, marking patterns 15 may be imprinted on both sides of tape 10, at equal intervals and identically opposite positions of tape 10, so that, regardless of whether tape 10 becomes twisted or not, patterns 15 will be properly located. This is most preferred, to accommodate unskilled labor and to minimize the chance for error. However, in an alternative embodiment, tape 10 may be imprinted with patterns 15 spaced at one distance on a first side, and a second distance on the second side. For example, tape 10 may have patterns 15 spaced at 16 inch centers on a first side, and at 24 inch centers on a second side.

Marking patterns 15, in the preferred embodiment are imprinted as black lines on a white tape. This coloring provides the greatest contrast to all carpenters, whether color blind or not. Nevertheless, regions 20, 30, 45 and 50 may be imprinted as a solid color or with black ink. The color, of course, may be any suitable color chosen by a designer. Likewise, box 60 and/or diamond 70 may also be filled.

The use of straight lines 25, 35, 40 and 55 is most preferred, since the lines provide an easy visual cue of where the lines will merge, even if the point of intersection is concealed by a board. Nevertheless, in less preferred embodiments, other shapes may be used in place of these lines. Most preferred will be shapes which provide a visual cue of the desired point of intersection.

FIG. 3 illustrates by enlarged sectional view the weave pattern of tape 10. This pattern will be referred to herein as being formed on the grain, as opposed to being formed on a bias. As is apparent in FIG. 3, there are a number of longitudinally extending strands of material 75. These longitudinally extending strands 75 are woven with transversely extending strands 85. The use of a woven tape 10 offers significant strength advantage, and the woven tape 10 may be readily stapled through or nailed through without separation or fracture of the strap. Even if one or several strands 75 are severed, the remaining strands 75 will support tape 10 against separation or sagging. This is particularly significant to ensure the durability of tape 10 at a construction job site, where the probability of damage during handling, installation and use is great.

The use of an on-grain weaving pattern prevents undesirable stretching. While tape 10 will elongate slightly when extending forces are applied, longitudinally extending strands 75 will resist stretching. Furthermore, even when tape 10 is overly stretched, there will remain a consistent spacing between marker patterns 15. Most preferably, however, a carpenter will stretch tape 10 to a predetermined tension which will correspond to an exact spacing of marker patterns 15. For example, the marker patterns 15 may be spaced at exactly 16 inches when a stretching force of 5 pounds is applied. This, of course, will be determined by the force applied during printing of marker patterns 15 and the exact spacing selected during the printing process. A most preferred tape is sold under the trademark NarroStrap Woven Cord Strapping, by Marcron of Redford, Mich. An alternative tape, sold under the trademark TimberStrap by the same company, is believed to be satisfactory. These tapes are believed to be manufactured from polyester and polypropylene material, which is flexible through a wide temperature range, chemically resistant, and relatively durable. While the material is not critical to the invention, a material which is relatively slippery but which will receive the printed marker patterns 15 is most preferred, since the final positioning of a board may involve sliding the board along tape 10 and it is most desirable for the board to slide relatively easily thereon without destroying marker patterns 15.

While the foregoing details what is felt to be the preferred embodiment of the invention, no material limitations to the scope of the claimed invention are intended. Further, features and design alternatives that would be obvious to one of ordinary skill in the art are considered to be incorporated herein. Therefore, the scope of the invention is set forth and particularly described in the claims hereinbelow.

We claim:

1. In combination, lumber having a predetermined width and a construction tape having a width, thickness, indeterminate length, and features designed to locate or measure repetitive positions for said lumber through said indeterminate length, wherein the improvement comprises a marker repetitively printed upon said tape having a center region which has a length parallel to said construction tape indeterminate length that is equal to said predetermined width of said lumber and which operatively defines a desired lumber position, said marker comprising:

a first visually converging region immediately adjacent said center region which has a width equal to one-half of said predetermined width of said lumber and which converges as a distance from said center region decreases;

a second visually converging region immediately adjacent said center region which has a width equal to one-half of said predetermined width of said lumber and which is spaced from said first visually converging region along said indeterminate length of said tape by said center region, said second visually converging region converging as the distance from said center region decreases;

a line transverse to said indeterminate length which divides said center region into two equal parts; and a diamond subdividing said transverse line into two equal parts.

2. The combination of claim 1 wherein said first visually converging region is bounded by a border that forms a mathematical greater-than sign.

3. A tool for locating first and second consistently sized structural components from each other within a static structure, comprising:

an indeterminate length strap having a first major surface;

a means comprising a line transverse to said indeterminate length patterned upon said first major surface for establishing a desired location of a first edge of said first consistently sized structural component;

a means comprising a line transverse to said indeterminate length patterned upon said first major surface for establishing a desired location of a second edge of said first consistently sized structural component;

a means comprising two converging lines patterned upon said first major surface and adjacent said first edge visual locating means for visually interpolating a displacement from said first edge;

a means patterned upon said first major surface and adjacent said second edge visual locating means for visually interpolating a displacement from said second edge; and a means for locating said second consistently sized structural component relative to one of said first edge locating means, said second edge locating means, said first edge displacement interpolating means and said second edge displacement interpolating means.

4. The tool of claim 3 further comprising a means patterned upon said first major surface for establishing a location midway between said first edge locating means and said second edge locating means.

5. The tool of claim 4 further comprising a means for visually sub-tending said midway locating means.

6. The tool of claim 3 wherein said indeterminate length strap further comprises an on-grain weave.

7. The tool of claim 6 wherein said indeterminate length strap further comprises a polymeric material.

8. The tool of claim 3 wherein said second edge displacement interpolating means comprises two converging lines.

9. A method for accurately positioning lumber within a framework, comprising the steps of:

forming an on-grain woven tape;

printing a marker pattern onto said tape, said marker pattern having a locating pattern and an optically converging pattern adjacent said locating pattern;

anchoring said printed tape within said framework;

positioning said lumber adjacent said marker pattern and concealing a portion of said marker pattern including a portion of said optically converging pattern;

sliding said lumber along said tape while simultaneously viewing said optically converging at pattern, until said optically converging pattern converges and intersects with said locating pattern; and anchoring said lumber to said framework subsequent to said sliding step.

* * * * *